US012449870B2

(12) United States Patent
Tan et al.

(10) Patent No.: US 12,449,870 B2
(45) Date of Patent: Oct. 21, 2025

(54) MANAGING POWER DURING RESETS OF DATA PROCESSING SYSTEMS

(71) Applicant: Dell Products L.P., Round Rock, TX (US)

(72) Inventors: Geroncio Ong Tan, Austin, TX (US); Adolfo Sandor Montero, Pflugerville, TX (US); Jui Chin Fang, Taipei (TW); Chien-Hao Chiu, Bade District (TW)

(73) Assignee: Dell Products L.P., Round Rock, TX (US)

( * ) Notice: Subject to any disclaimer, the term of this patent is extended or adjusted under 35 U.S.C. 154(b) by 26 days.

(21) Appl. No.: 18/359,523

(22) Filed: Jul. 26, 2023

(65) Prior Publication Data

US 2025/0036177 A1 Jan. 30, 2025

(51) Int. Cl.
*G06F 1/26* (2006.01)
(52) U.S. Cl.
CPC ..................... *G06F 1/26* (2013.01)
(58) Field of Classification Search
CPC .......................................................... G06F 1/26
See application file for complete search history.

(56) References Cited

U.S. PATENT DOCUMENTS

| 2004/0143776 | A1* | 7/2004 | Cox | G06F 11/0745 714/25 |
| 2005/0229042 | A1* | 10/2005 | Crowell | G06F 11/2284 714/36 |
| 2011/0276813 | A1* | 11/2011 | Kamijima | G06F 1/3293 713/320 |
| 2013/0254586 | A1* | 9/2013 | Winger | G06F 11/0742 714/E11.138 |
| 2013/0290740 | A1* | 10/2013 | Ziarnik | G06F 9/4411 713/300 |
| 2016/0070320 | A1* | 3/2016 | Ravirala | G06F 11/0793 714/23 |
| 2022/0318154 | A1* | 10/2022 | Fuller | G06F 12/0891 |
| 2023/0205299 | A1* | 6/2023 | Lagnado | G06F 1/3206 713/320 |
| 2023/0393934 | A1* | 12/2023 | Gohain | G06F 11/076 |

* cited by examiner

Primary Examiner — Nimesh G Patel
(74) Attorney, Agent, or Firm — WOMBLE BOND DICKINSON (US) LLP

(57) ABSTRACT

Methods and systems for managing data processing systems are disclosed. To address undesired operation of the data processing systems, power supplied to various components of the data processing system may be temporarily removed. After prescribed durations of time have elapsed, the power may be resupplied to the components. The power may be supplied by a primary batter of the data processing system. The components may include both data processing components such as processors and management components such as chipsets.

20 Claims, 6 Drawing Sheets

MANAGING POWER DURING RESETS OF DATA PROCESSING SYSTEMS

FIELD

Embodiments disclosed herein relate generally to device management. More particularly, embodiments disclosed herein relate to systems and methods for management of undesired operation of devices.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1A:
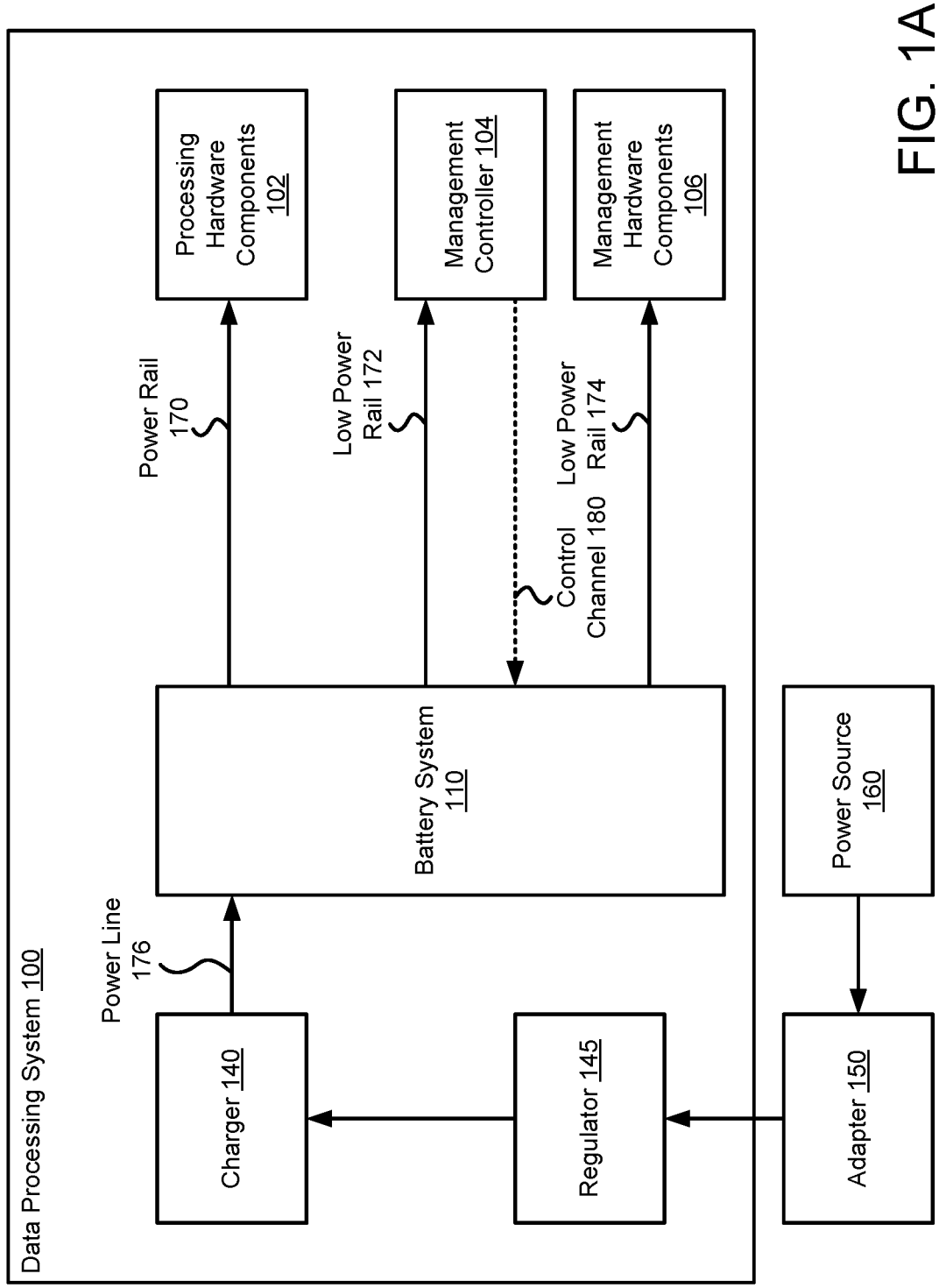
FIG. 1A shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing power provided to a data processing system. The power may be managed to address undesired operation of components of the data processing system. When a component operates in an undesired manner, the component may be reset by removing power to the component for a duration of time, and then providing power after the duration of time. Doing so may cause the component to reset its operation thereby eliminating the undesired operation and returning to nominal operation.

To manage the power, a management controller of the data processing system may issue a request to a battery manager of a battery system of the data processing system. The request may be to temporarily depower power rails that power the component.

In response to receiving the request, the battery manager may temporarily flush power from one or more power rails that supply power to components of the data processing system. After the period of time has elapsed, the battery manager may repower the power rails thereby restarting various components powered by the power rails.

The battery manager may manage a battery that supplies power to the component and other components such as processors or other devices that provide desired computer implemented services. In contrast to these other components that may be regularly depowered, the component may not be regularly depowered. Rather, the component may remain powered while other components are depowered when the data processing system enters low power states. The component may be tasked with identifying when user input is provided to the data processing system. By doing so, a data processing system may detect and respond to user input indicating that the data processing system is to return to a normal operating state from the low power operating state.

Temporarily depowering the component and repowering the component via the battery manager, the data processing system may eliminate undesired operation while retaining the ability to repower its components (which may otherwise rely on the ability of the component to detect user input provided via buttons or other human interface devices of the data processing system).

Thus, embodiments disclosed herein may address, in addition to others, the technical problem of undesired operation of systems. A system in accordance with an embodiment may address the undesired operation through performance of a power restart where impacted components are depowered temporarily and automatically repowered. By utilizing functionality of a battery manager, embodiments disclosed herein may do so while minimizing addition of various components to the system.

In an embodiment, a method for managing power in a data processing system is provided. The method may include identifying an occurrence of an event impacting a management hardware component of the data processing system, the event being likely to cause undesired operation of the management hardware component until the power is withdrawn from the management hardware component for a duration of time, and the management hardware component being powered by a primary battery of the data processing system; in response to identifying the occurrence: issuing, by a management controller of the data processing system, a power flush request to a battery management controller of the data processing system; based on the power flush request, flushing, by the battery management controller, the power from at least one power rail that supplies power to the management hardware component; and after the duration of time after the power is flushed from the at least one power rail, refreshing, by the battery management controller, power to the at least one power rail.

Identifying the occurrence of the event may include, during a startup of the data processing system: obtaining first user input indicating a power reset of the data processing system is to be performed, the power reset being accomplished by depowering all power rails of the data processing system; based on the first user input, providing, to a user and via a graphical user interface, a request to confirm the request for the power reset; obtaining, via the graphical user interface, second user input confirming the request for the power reset; and treating the second user input as an indication of the occurrence of the event.

Identifying the occurrence of the event may include identifying, by the management controller, a second duration of time from a start of a startup procedure of the data processing system while the startup procedure has not completed; and treating an occurrence of the second duration of time as an indication of the occurrence of the event.

The at least one power rail may include a first power rail that supplies the power to processing hardware components of the data processing system, a second power rail that supplies the power to the management controller, and a third power rail that supplies the power to at least the management hardware component.

Flushing the power may include configurating a power flow control component that regulates a flow of the power from a power regulator to the third power rail, the power conditioning that conditions, at least in part, a second flow of the power from the primary battery to the power flow control component.

The power flow control component may include at least one selected from a group consisting of a switch and a field effect transistor.

The management controller may be operably connected to the battery management controller via at least one selected from a group consisting of a general purpose input-output pin and a communication bus.

The battery management controller may include a timer, and flushing the power comprises using the timer to identify when the duration of time from when the power is flushed from the at least one power rail has elapsed.

The power may continue to be flushed from the at least one power rail during the duration of time.

The management hardware component may include memory that is adapted to be reset when the power is flushed from the at least one power rail.

The duration of time may be based at least on a duration of time required for the memory to reset while the power is flushed.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the method when the computer instructions are executed by the processor. The non-transitory media and the processor may be part of a management controller of the data processing system.

Turning to FIG. 1A, a block diagram illustrating a system in accordance with an embodiment is shown. In FIG. 1A (and FIG. 1B, discussed below), rectangular blocks represent devices and components of devices. A select number of power flows between the components are illustrated using solid lines terminating in arrows. The direction of the arrows indicates the direction of power flow. Additionally, a select number of communication channels are illustrated using dashed lines terminating in arrows. However, it will be appreciated that these selections are shown to clarify certain aspects of the disclosure, but that additional, different, and/or fewer power flows and communication channels may be present without departing from embodiments disclosed herein.

The system shown in FIG. 1A may provide computer-implemented services. The computer implemented services may include any type and quantity of computer implemented services. For example, the computer implemented services may include data storage services, instant messaging services, database services, and/or any other type of service that may be implemented with a computing device.

To provide the computer implemented services, the system may include data processing system 100. Data processing system 100 may include any number of processing hardware components 102 that provide the computer implemented services. For example, processing hardware components 102 may include processors, memory modules, storage devices, communication devices, and/or other types of devices. These processing hardware components 102 may host software applications that provide the computer implemented services.

To operate, processing hardware components 102 may consume power and generate heat. The power may be provided by a battery of battery system 110 (e.g., when power from other sources is unavailable) and/or external power sources such as power source 160.

Power source 160 may be a utility company or other type of power supply system. The power provided by power source 160 may be provided at voltage levels incompatible with the operation of data processing system 100. To facilitate use of the power provided by power source 160, adapter 150 may be used. Adapter 150 may be a hardware device that converts power provided by power source 160 into a type usable by data processing system 100.

For example, adapter 150 may convert alternating current to direct current at a prescribed voltage level usable to power hardware components 102 (e.g., if active) and/or charge battery system 110 (e.g., if a battery thereof is at least partially discharged).

The power from adapter 150 may be regulated by regulator 145 prior to use by processing hardware components 102 and/or other components of data processing system 100.

To charge battery system 110 using the power, data processing system 100 may include charger 140. Charger 140 may use the power provided by adapter 150 to charge battery system 110, when at least partially discharged. Charger 140 may condition, manage, and/or otherwise place the power in condition expected by battery system 110.

To provide the computer implemented services, data processing system 100 may need to enter an operating state. To enter the operating state, data processing system 100 may perform a startup procedure. During the startup procedure, management hardware components 106 (e.g., chip sets that support operation of a basic input output system, and/or other types of management entities) may perform various functionalities and/or management controller 104 may perform various startup orchestration operation. By doing so, a series of operations may be performed that enable the computer implemented services to be provided.

To perform the startup, management hardware components 106 and/or management controller 104 may need to operate in certain manners. For example, any of these components may need to remain active (e.g., to detect when power buttons are pressed thereby facilitate repowering of other components, etc.). To remain active, management hardware components 106 may continue to remain powered using power from battery system 110 while other components of data processing system 100 are depowered.

However, if management hardware components 106 and/or management controller 104 suffer errors in operation, these components may be unable to operate in the manners necessary. For example, corruption of data stored in memory of these components may prevent startups from being completed, may cause various errors to occur during the startup, may cause errors during runtime following startups, etc. Further, when these issues occur, data processing system 100 may become unresponsive and may not be able to complete startups. Consequently, the desired computer implemented services provided by data processing system 100 may be unavailable.

In general, embodiments disclosed herein may provide methods, systems, and/or devices for managing errors in operations of data processing systems. To manage the errors in operation, the data processing systems may perform restart procedures during which power supplied to various components may be withdrawn. By withdrawing the power, the components may perform hard restart procedures when power is returned to them.

For example, the components may clear and rewrite data used in operation to memory, registered, and/or other transitory storage media. Additionally, for example, various configuration settings may be set to default settings. By doing so, the components may be more likely to exit undesired operating states and return to nominal operation.

The components may include processing hardware components 1021, management controller 104, and/or management hardware components 106. However, as noted above, when power is removed from management hardware components 106, data processing system 100 may lose the native ability to identify when a user has requested (e.g., by pushing a power button) that data processing system 100 power back up. For example, management hardware components 106 may be tasked with monitoring signals from various human interface devices while data processing system 100 is in a low power state (e.g., powered off). While unpowered, management hardware components 106 may lack the ability to initiate repowering of data processing system 100.

To depower and repower management hardware components 106, management controller 104, processing hardware components 102, and/or other components, battery system 110 may include functionality to perform a power reset. During the power reset, battery system 110 may flush power from various power rails (e.g., 170, 172, 174) used to distribute power. Once flushed, battery system 110 may wait a duration of time and during which the power may remain flushed from the power rails. The duration of time may be based on how long components powered by the power rails are likely to require to reset themselves.

After waiting the duration of time, battery system 110 may repower the power rails. By doing so, management hardware components 106, management controller 104, processing hardware components 102, and/or other components may be depowered and repowered without needing external input or control. Accordingly, data processing system 100 may be more likely to successfully exit undesired operating states and enter desired operating states.

To provide the above noted functionality, data processing system 100 may include various hardware components. Some of the hardware components are discussed below.

Processing hardware components 102 may be implemented using processors, memory modules, storage devices, communication devices, and/or other types of hardware components. The hardware components may support the execution of various software components including, for example, startup management entities (e.g., basic input output systems), operation management entities (e.g., operating systems, drivers, etc.), applications that provide desired computer implemented services, etc.

Management controller 104 may manage the operation of data processing system 100. To do so, management controller 104 may (i) monitor operation of data processing system 100 for undesired operation that may require a power restart to correct, and (ii) when such undesired operation is identified, issue power flush requests to battery system 110. To communicate with battery system 110, management controller 104 may be operably connected via control channel 180. Control channel may be implemented with a point to point connection (e.g., using a general purpose input-output pin) or via a bus (e.g., such as a shared data bus). When the power flush request is sent, battery system 110 may respond by performing a power start procedure where the power rails are flushed and then refreshed with power.

Management controller 104 may be implemented using a system on a chip, an independent processing complex, and/or other types of hardware devices that function as an independently operating data processing system. The components of management controller 104 may be operably connected with other components of data processing system 100 for sideband and/or direct communication purposes. In this manner, management controller 104 may obtain information regarding the operation of data processing system 100, interact with users of data processing system 100 (e.g., using displays of data processing system 100 and human interface devices to obtain user input), issue commands to other components, and/or otherwise manage the operation of data processing system 100.

Management hardware components 106 may be implemented using one or more chipsets. The chipsets may process input from various human interface devices and initiate performance of various functions of data processing system 100. In contrast to other components of data processing system 100, management hardware components 106 may generally remain operational regardless of the power state of data processing system 100. Consequently, data processing system 100 may continue to respond to actuations of human interface devices (e.g., buttons, scroll wheels, etc.). For example, management hardware components 106 may be tasked with waking data processing system 100 while in low power states.

Battery system 110 may provide power to processing hardware components 102, management controller 104, and/or management hardware components 106 while power from other sources (e.g., power source 160) is unavailable. By doing so, data processing system 100 may continue to operate while unplugged from other power sources.

Figure 1B:
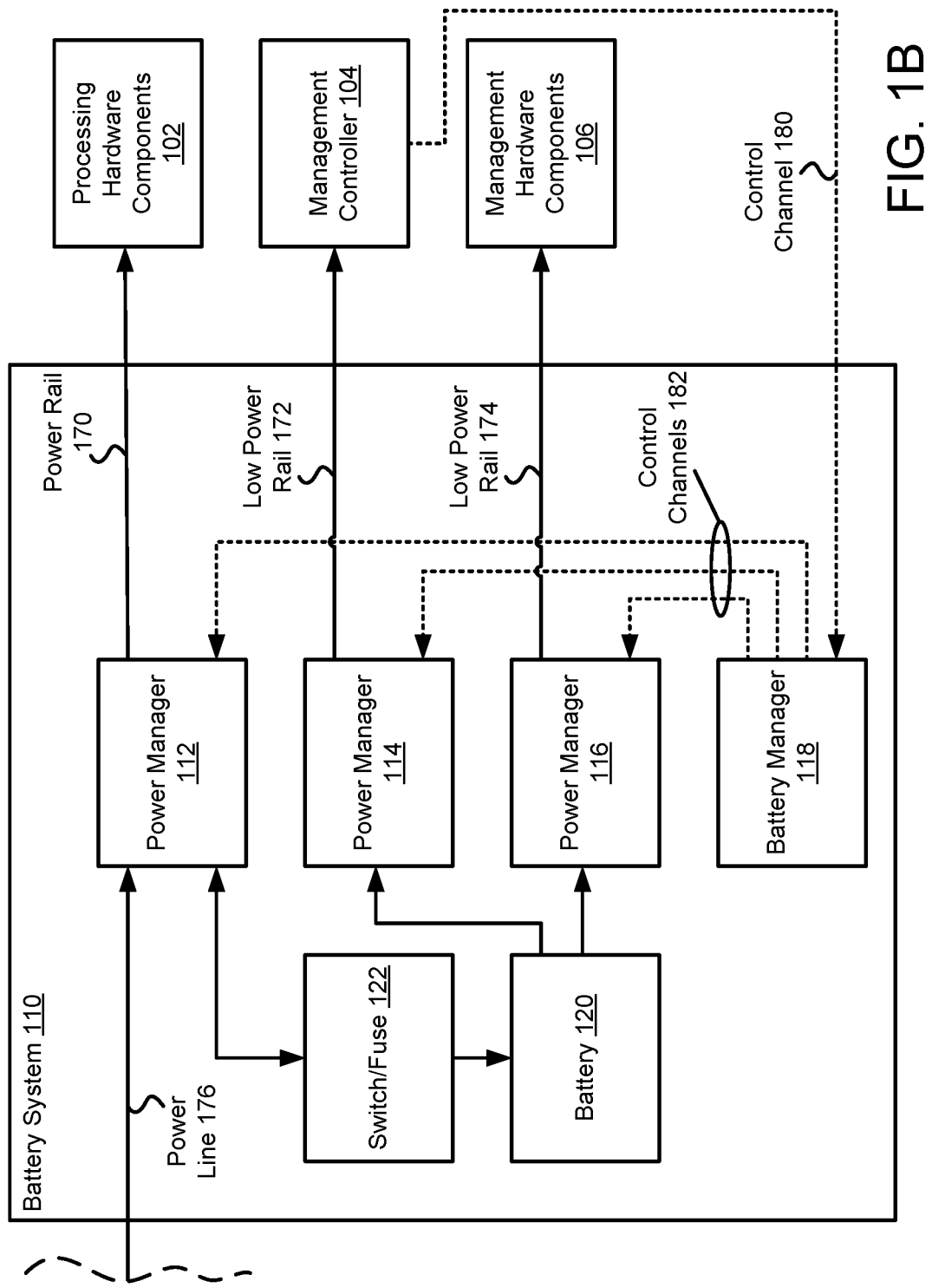
FIG. 1B shows a block diagram illustrating a component of a system in accordance with an embodiment.

Additionally, battery system 110 may perform power restarts, as discussed above, when requests are received via control channel 180. Refer to FIG. 1B for additional details regarding battery system 110.

To provide power to other components, data processing system may include various rails (e.g., 170-174) that distribute power. Different power rails may distribute power at different voltage and/or current levels. For example, power rail 170 may distribute power at a system voltage level (or voltage level of battery system 110). The system voltage level may be, for example, between 11 Volts and 13 Volts. The components operably connected to power rail 170 (e.g., such as processing hardware components 102) may use the power to provide computer implemented services.

In contrast, low power rail 172 and low power rail 174 may provide power at lower voltage levels (e.g., logic voltage levels used by complementary metal-oxide semiconductor (CMOS) devices). These power rails may supply power to management controller 104 and management hardware components 106, respectively.

To distribute the power, battery system may receive power from charger 140 via power line 176.

Figure 3:
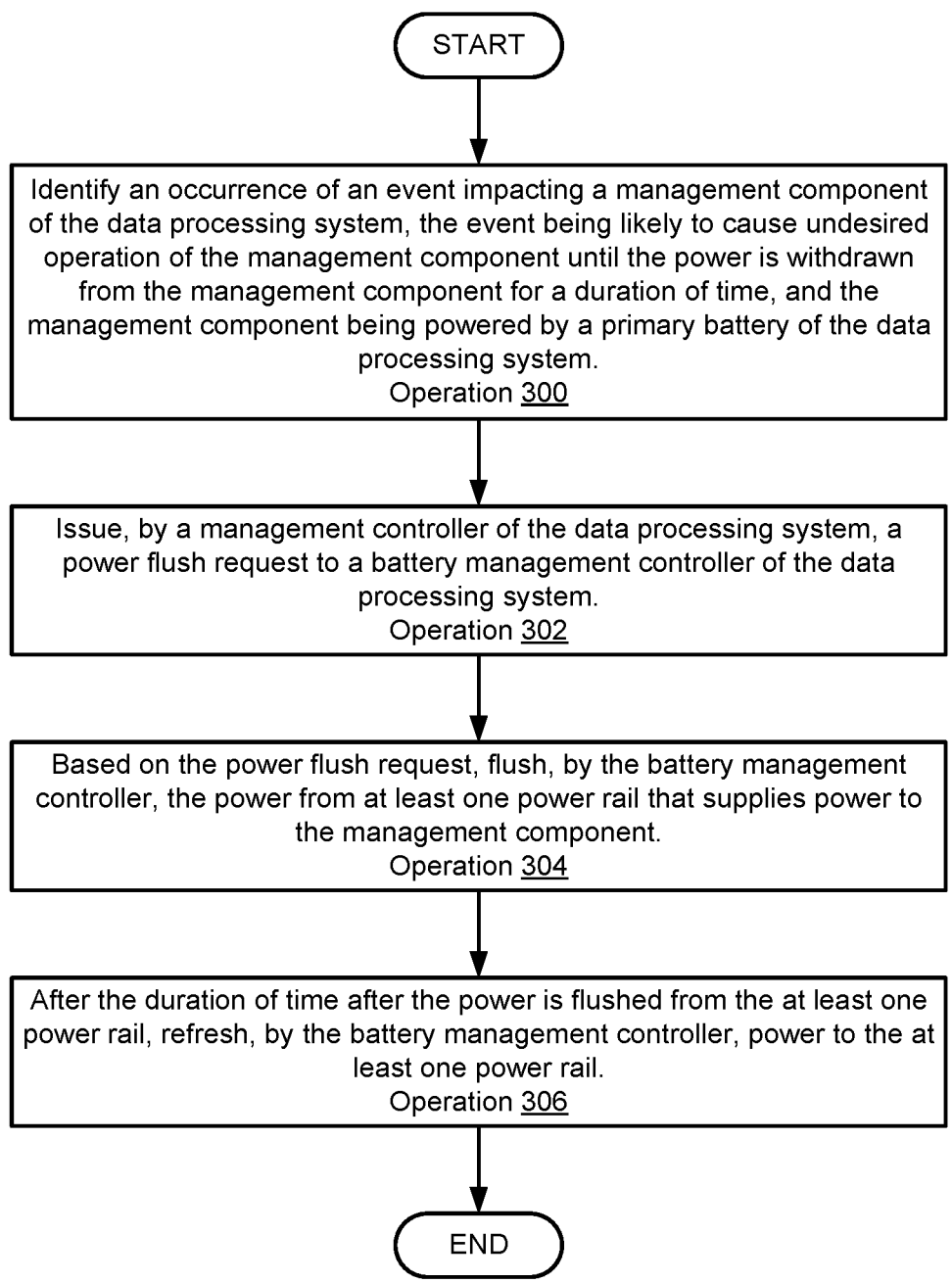
FIG. 3 shows a flow diagram illustrating a method in accordance with an embodiment.

When providing their functionality, any of (and/or components thereof) management controller 104, processing hardware components 102, management hardware components 106, and battery system 110 may perform all, or a portion, of the method illustrated in FIG. 3.

Data processing system 100 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

The power flows shown in FIG. 1A may be implemented using wiring harnesses, power buses, and/or other power distribution structures.

Any of the components shown in FIG. 1A may be operably connected to one another using any connectivity medium. For example, the components of data processing system 100 may be operably connected to each other via point to point links, data buses, and/or other communication mediums.

While illustrated in FIG. 1A as including a limited number of specific components, a system in accordance with an embodiment may include fewer, additional, and/or different components than those components illustrated therein.

Turning to FIG. 1B, a second block diagram in accordance with an embodiment is shown. The second block diagram may illustrate components of battery system 110. As discussed above, battery system 110 may manage power distribution from charger 140 to other components of a data processing system.

To provide its functionality, battery system 110 may include various power managers (e.g., 112-116), battery manager 118, battery 120 (also referred to as a "primary battery"), and switch/fuse 122. Each of these components is discussed below.

Power manager 112 may selectively either (i) draw power from power line 176 and charge battery 120 while power from an external source is available, (ii) draw power from battery 120 and supply power to power rail 170, or (iii) flush power rail 170 of power during power restarts. Power manager 112 may do so based on instructions from battery manager 118. For example, power manager 112 may be operably connected to battery manager 118 (e.g., via control channels 182) to receive instructions. Thus, power manager 112 may modify its behavior based on instructions from battery manager 118.

Power manager 112 may be implemented using, for example, a field effect transistor complex. The field effect transistor complex may include functionality to direct flow of power, conditions flows of power, and flush power (e.g., act as a sink).

Power manager 114 may selectively (i) draw power from power line 176 and supply power to low power rail 172, (ii) draw power from battery 120 and supply power to low power rail 172, or (iii) flush low power rail 172 of power during power restarts. Power manager 114 may do so based on instructions from battery manager 118. For example, power manager 114 may be operably connected to battery manager 118 (e.g., via control channels 182) to receive instructions. Thus, power manager 114 may modify its behavior based on instructions from battery manager 118.

Power manager 114 may be implemented using, for example, a low drop-out voltage regulator. The low dropout regulator may selectively obtain power (e.g., at a voltage level of the source) from battery 120 or power line 176, and reduce a voltage level of the power to match that expected to be available via low power rail 174. The low dropout regulator may include an enable pin, which may utilize the instructions from battery manager 118 to selectively provide power to or flush power from low power rail 174.

Power manager 116 may selectively (i) draw power from power line 176 and supply power to low power rail 174, (ii) draw power from battery 120 and supply power to low power rail 174, or (iii) flush low power rail 174 of power during power restarts. Power manager 116 may do so based on instructions from battery manager 118. For example, power manager 116 may be operably connected to battery manager 118 (e.g., via control channels 182) to receive instructions. Thus, power manager 116 may modify its behavior based on instructions from battery manager 118.

Power manager 116 may be implemented using, for example, a low drop-out voltage regulator. The low dropout regulator may selectively obtain power (e.g., at a voltage level of the source) from battery 120 or power line 176, and reduce a voltage level of the power to match that expected to be available via low power rail 174. The low dropout regulator may include an enable pin, which may utilize the instructions from battery manager 118 to selectively provide power to or flush power from low power rail 174.

Power manager 116 may also be implemented using a field effect transistor, load switch, or other hardware component for flushing power form low power rail 174. For example, the switch may selectively disconnect low power rail 174 from the low drop-out voltage regulator, or the field effect transistor may perform a similar function.

Figure 2A:
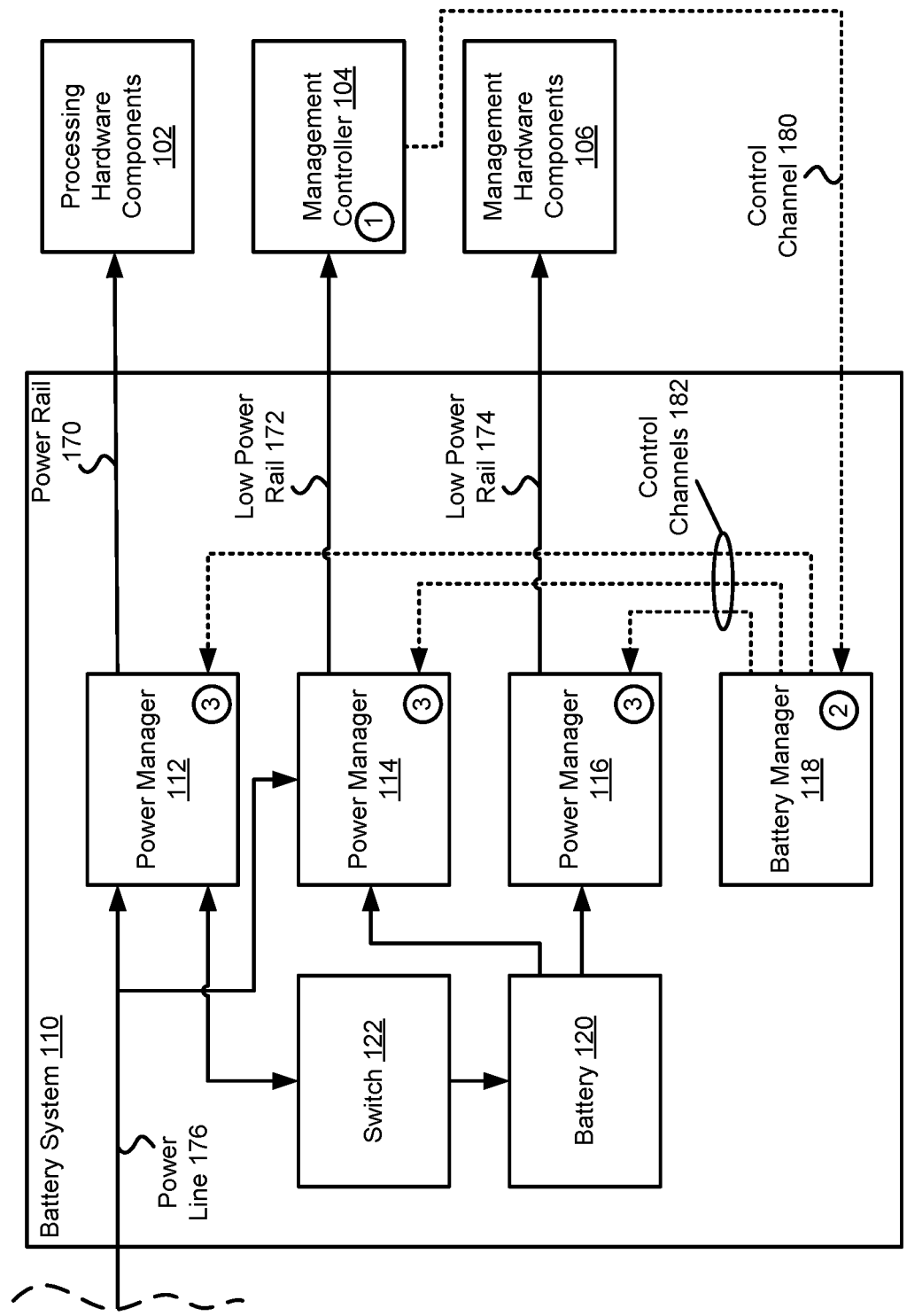
FIG. 2A shows a first data flow diagram in accordance with an embodiment.
Figure 2B:
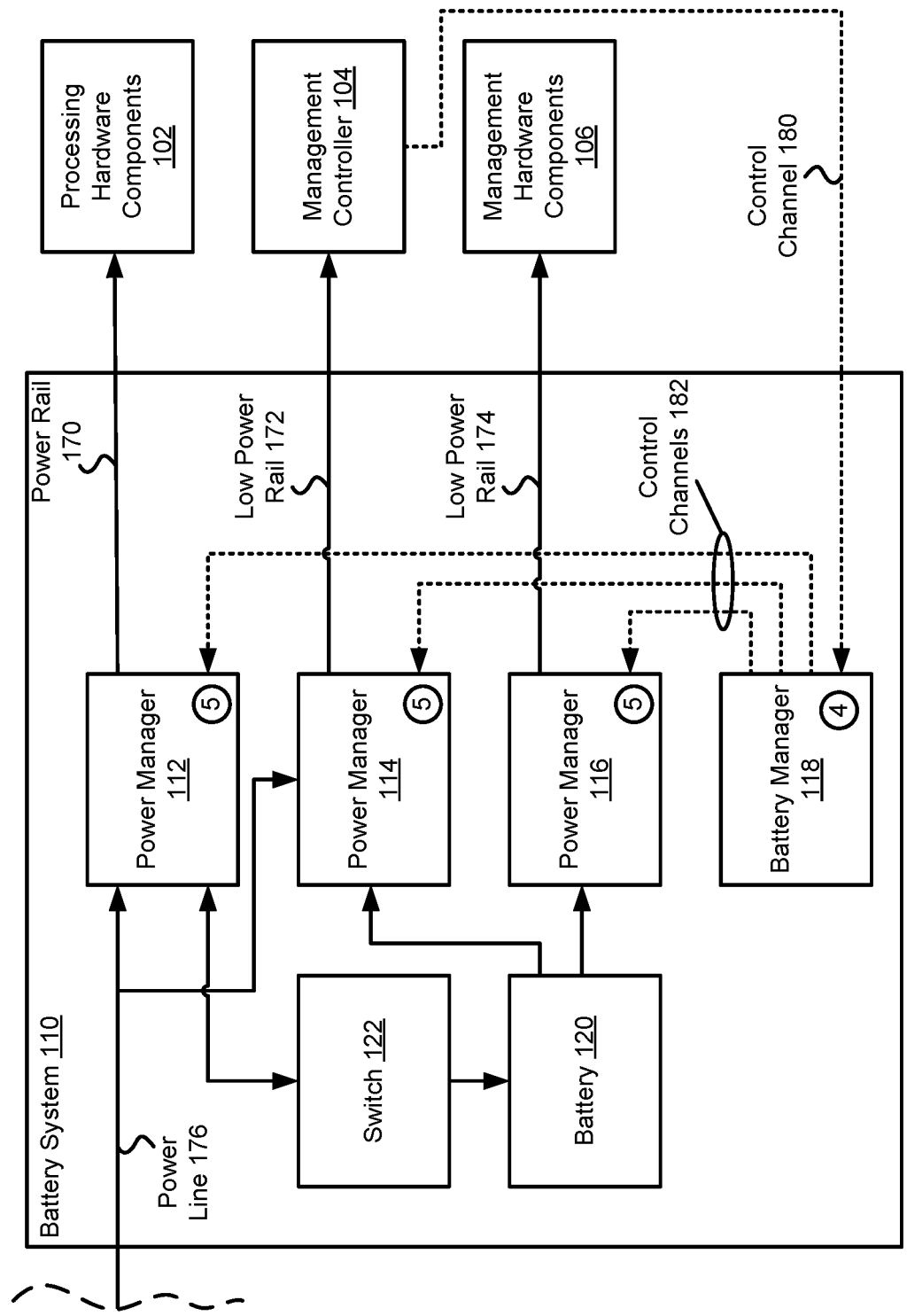
FIG. 2B shows a second data flow diagram in accordance with an embodiment.

Battery manager 118, as noted above, may manage performance of power restarts by (i) obtaining requests for such restarts from management controller 104 via control channel 180, (ii) send instructions to power managers (112-118) to flush the power rails, (iii) track the duration of time while the power rails are flushed using a timer, (iv) once the duration of time meets a criteria (e.g., a predetermined length), sending instructions to power managers 112-118 to refresh (e.g., start supplying) power to the power rails. Refer to FIGS. 2A-2B for additional details regarding performing power restarts.

Additionally, battery manager 118 may manage battery 120 by selectively charging it (e.g., by sending instructions to power manager 112).

Battery manager 118 may be implemented with a controller (e.g., a microcontroller, digital signal processor, system on a chip, application specific integrated circuit, etc.).

Battery 120 may be implemented using any type of power storage device, including, for example, any number and types of electrochemical cells. The electrochemical cells may be implemented using any battery chemistry.

To manage charging and discharging of battery 120, switch/fuse 122 may selectively connect battery 120 to power provided by power manager 112. For example, switch/fuse 122 may open should power at undesirable levels begin flowing into battery 120.

While illustrated in FIG. 1B as including a limited number of specific components, a battery system in accordance with an embodiment may include fewer, additional, and/or different components than those components illustrated therein.

Additionally, while illustrated in FIGS. 1A-1B as including two low power rails, it will be appreciated that a data processing system may implement a single low power rail to supply power to both management controller 104 and management hardware components 106. In such a scenario, a battery system may include a reduced number of components.

As discussed above, data processing system 100 may initiate performance of power restarts when it has entered undesired operating states (e.g., otherwise unrecoverable operating states). Turning to FIGS. 2A-2B, flow diagrams in accordance with an embodiment is shown. The flow diagrams may illustrate operations performed by the components of data processing system 100 to complete a power restart. In FIGS. 2A-2B, activity of different components is highlighted using numbered blocks (e.g., 1, 2, 3, etc.) positioned over the component participating in the activity.

At block 1, management controller 104 may identify an occurrence of an event indicating that a host data processing system has entered an undesired operating state. Management controller 104 may do so by (i) automatically, for example, by identifying that a startup has not completed within a prescribed duration of time, or (ii) in a semiautomated manner, for example, by receiving user input indicating that the event has occurred.

The user input may be obtained during a startup such as via a user pressing a prescribed group of buttons in a particular sequence. Once the user input is obtained, management controller 104 may take over use of display and human interface devices to (i) prompt the user to confirm that a power restart is to be performed, and (ii) obtain additional user input signifying that the user confirms that the power restart is to be performed.

Once the occurrence is identified, management controller 104 may send a request to battery manager 118.

At block 2, battery manager 118 obtains and processes the request. Once processed, battery manager 118 may (i) instruct power manager 118 to flush the power rails (e.g., 170-174), and (ii) initiate operation of a timer to track the duration of time elapsed from when the power rails are flushed of power. While described with respect to a timer (e.g. a function of battery manager 118), other components may be used to track the duration of time elapsed from when the power rails are flushed.

At block 3, the power managers (112-116) obtain the instructions, and flush the power rails (170-174) of power. In other words, the power rails may be depowered.

Turning to FIG. 2B, at block 4, battery manager 118 both (i) identifies that the duration of time that has elapsed meets a criteria (e.g., a prescribed duration of time, may be static or dynamically set based on user input, durations of previous flushes), and (ii) instruct the power managers (e.g., 112-116) to repower the power rails (e.g., 170-174).

At block 5, the power managers (e.g., 112-116) receive the instructions and power the power rails (e.g., 170-174).

Thus, via the flows shown in FIGS. 2A-2B, a power reset may be performed which fully depowers management components (e.g., management controller 104, management hardware components 106) but still results in the components of the data processing system repowering themselves after a prescribed duration of time. Consequently, the data processing system may be more likely to be able to successfully enter a desired operating state through complete resets of various hardware components thereby reverting their operating states to nominal operating states (e.g., if possible).

As discussed above, the components of FIGS. 1A-1B may perform various methods to manage data processing systems when the data processing systems enter undesired operating states, such as hard hangs where startups are unlikely to complete successfully and/or other undesired activity occurs. FIG. 3 illustrates a method that may be performed by the components of the system of FIGS. 1A-1B. In the diagram discussed below and shown in FIGS. 3, any of the operations may be repeated, performed in different orders, and/or performed in parallel with or in a partially overlapping in time manner with other operations.

Turning to FIG. 3, a flow diagram illustrating a method for managing power for a data processing system in accordance with an embodiment is shown. The method may be performed by components of the system shown in FIGS. 1A-1B.

Prior to operation 300, a management hardware component may enter an undesired operating state. The management hardware component may enter the undesired operating state due to, for example, data corruption, misconfiguration, and/or for other reasons. While in the undesired operating state, a host data processing system may experience various impacts. For example, the data processing system as a whole may enter an undesired operating state, which may result in hanging/freezing of the system, inability to complete various procedures, and/or other undesired impacts.

At operation 300, an occurrence of an event impacting a management components of the data processing system is identified. The event may be likely to cause undesired operation of the management component until power is withdrawn from the management components for a duration of time (e.g., causing the management component to reset itself). The management component may be powered by a primary batter of the data processing system. The primary battery may be unremovable in normal use. For example, the primary batter may be within a chassis of the data processing system. While removable via special procedure, the battery may not otherwise be removable (e.g., in an easy manner). Consequently, the management component may remain powered and may not be easily depowered by removing the primary batter. The primary battery may also supply power to processors, memory modules, and/or other components of the data processing system.

The occurrence of the event may be identified automatically, and/or semiautomatically, as discussed with respect to FIGS. 2A-2B. For example, the event may be automatically identified based on monitoring by a management controller of the data processing system, which may monitor for durations of time spent performing startups and/or other types of operations.

The occurrence may be semiautomatically identified by a user pressing a particular key sequence at a particular time (e.g., during a startup, while the system is hanging, etc.). The key sequence may be monitored for and identified by the management controller. When identified, the management controller may automatically perform a verification process by displaying information requesting that the user confirm that a power restart should be performed, and obtaining user input regarding whether the user confirm that the power restart should be performed.

At operation 302, a power flush request is issued by the management controller. The power flush may be issued to a battery management controller of a battery system of the data processing system. The power flush request may be issued by generating the request (e.g., a data structure) and providing the request to the battery management controller (e.g., battery manager 118). The request may be provided by sending it via a communication channel.

At operation 304, based on the power flush request, the battery management controller may flush the power from at least one power rail that supplies power to the management component. The battery management controller may flush the power by issuing instructions to power managers that manage the at least one power rail. When received, the power managers may depower the power rails and/or ground the at least one power rail. The at least one power rail may include any number of power rails that power management components such as management controllers, management hardware components, etc. By doing so, the management controllers may reset themselves so long as they remain depowered for a duration of time.

The battery management controller may also start a timer to identify when the duration of time has elapsed.

At operation 306, after the duration of time after the power is flushed from the at least one power rail, the power to the at least one power rail may be refreshed by the battery management controller. The power may be refreshed by the battery management controller issuing instructions (e.g., driving enable lines high) to power managers. When received, the instructions may cause the power managers to supply power to the at least one power rail.

The method may end following operation 306.

Following operation 306, the management component may begin to operate, and may be more likely to resume nominal rather than undesired operation.

Figure 4:
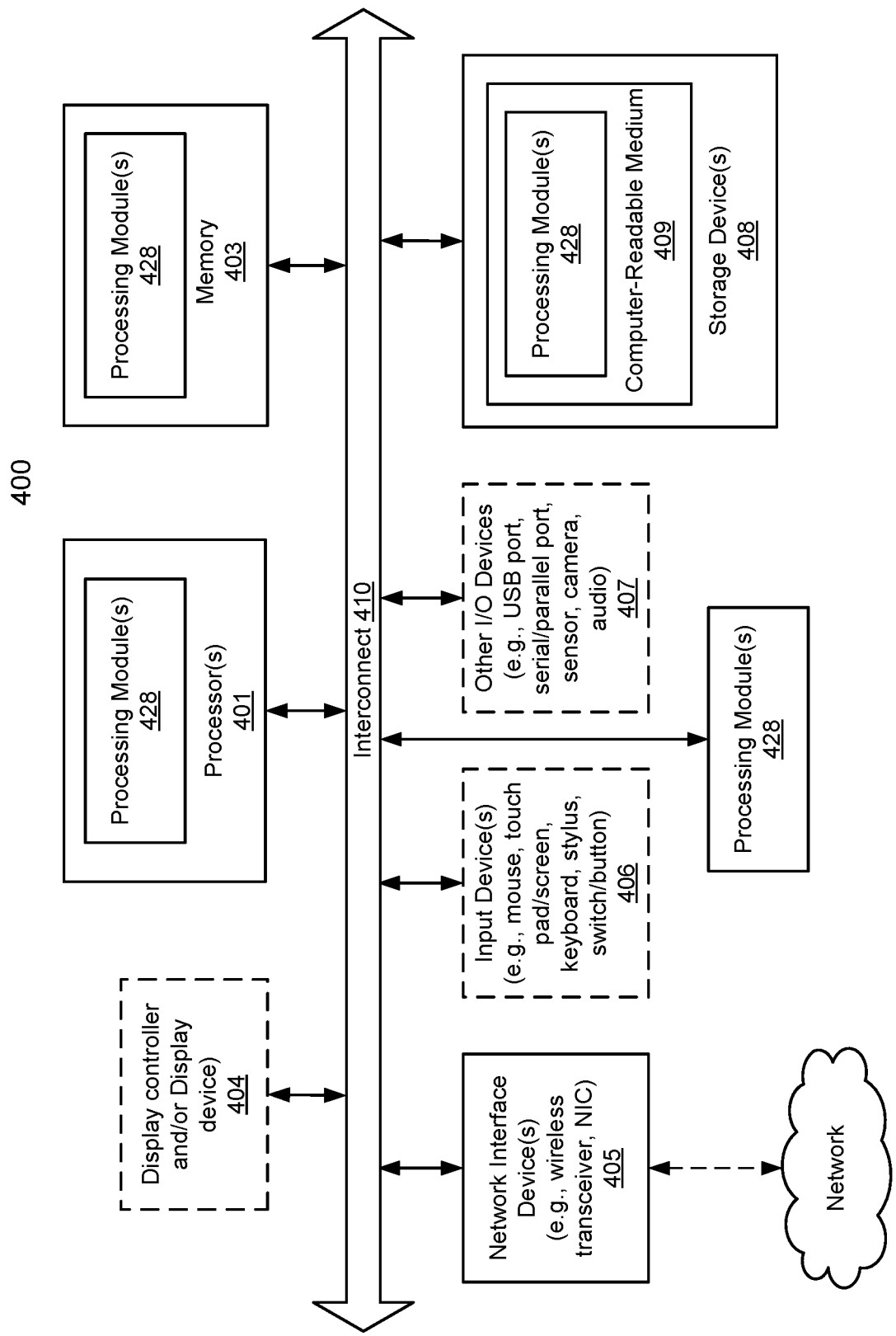
FIG. 4 shows a block diagram illustrating a data processing system in accordance with an embodiment.

Any of the components illustrated in FIGS. 1A-2B may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing power in a data processing system, the method comprising:
identifying an occurrence of an event impacting a management hardware component of the data processing system, the event being likely to cause undesired operation of the management hardware component until the power is withdrawn from the management hardware component for a duration of time, the management hardware component being powered by a primary battery of the data processing system, and the management hardware component being a component of the data processing system that remains powered by the primary battery even when all other components of the data processing system are depowered when the data processing system is non-operational in a powered off state of the data processing system;
in response to identifying the occurrence:
issuing, by a management controller of the data processing system that is separate from the components of the data processing system, a power flush request to a battery management controller of the data processing system, the management controller being a separate data processing system that is physically installed within the data processing system and that operates independently from the data processing system using a second processor that is separate from a first processor of the data processing system, the second processor being capable of issuing commands to the first processor and the other components of the data processing system for the management controller to manage power-related and non-power-related operations of the data processing system;
based on the power flush request, flushing, by the battery management controller, the power from at least one power rail that supplies power to the management hardware component; and
after the duration of time after the power is flushed from the at least one power rail, refreshing, by the battery management controller, power to the at least one power rail.

2. The method of claim 1, wherein identifying the occurrence of the event comprises:
during a startup of the data processing system:
obtaining first user input indicating a power reset of the data processing system is to be performed in response to a main processor of the data processing system being unable to complete the startup, the main processor being the first processor, and the power reset being accomplished by depowering all power rails of the data processing system;
in response to the first user input, providing by the management controller, after the second processor of the management controller takes control over use of display and human interface devices of the data processing system from the main processor of the data processing system and via a graphical user interface displayed on a display of the data processing system that is now controlled by the management controller, a request to a user of the data processing system to confirm the request for the power reset;
obtaining, via the graphical user interface, second user input confirming the request for the power reset; and
treating the second user input as an indication of the occurrence of the event.

3. The method of claim 1, wherein identifying the occurrence of the event comprises:
identifying, by the management controller, a second duration of time from a start of a startup procedure of the data processing system while the startup procedure has not completed; and
treating an occurrence of the second duration of time as an indication of the occurrence of the event.

4. The method of claim 1, wherein the at least one power rail comprises a first power rail that supplies the power to processing hardware components of the data processing system, a second power rail that supplies the power to the management controller, and a third power rail that supplies the power to at least the management hardware component.

5. The method of claim 4, wherein flushing the power comprises:
configuring a power flow control component that regulates a flow of the power from a power regulator to the third power rail, the power flow control component also being configured to perform power conditioning that conditions, at least in part, a second flow of the power from the primary battery to the power flow control component.

6. The method of claim 5, wherein the power flow control component comprises at least one selected from a group consisting of a switch and a field effect transistor.

7. The method of claim 1, wherein the management controller is operably connected to the battery management controller via at least one selected from a group consisting of a general purpose input-output pin and a communication bus.

8. The method of claim 1, wherein the battery management controller comprises a power flush timer configured to track a timing associated with the flushing of the power from at least one power rail, and flushing the power comprises using the power flush timer to identify when the duration of time from when the power is flushed from the at least one power rail has elapsed.

9. The method of claim 8, wherein the power continues to be flushed from the at least one power rail during the duration of time.

10. The method of claim 9, wherein the management hardware component comprises memory that is adapted to be reset when the power is flushed from the at least one power rail.

11. The method of claim 10, wherein the duration of time is based at least on a duration of time required for the memory to reset while the power is flushed.

12. The method of claim 1, wherein, when the management hardware component remains powered while the data processing system is non-operational, the data processing system is unable to provide any computer implemented services to a user of the data processing system.

13. A non-transitory machine-readable medium having instructions stored therein, which when executed by at least one processor, cause a system to perform operations for managing power in a data processing system, the operations comprising:

identifying an occurrence of an event impacting a management hardware component of the data processing system, the event being likely to cause undesired operation of the management hardware component until the power is withdrawn from the management hardware component for a duration of time, the management hardware component being powered by a primary battery of the data processing system, and the management hardware component being a component of the data processing system that remains powered by the primary battery even when all other components of the data processing system are depowered when the data processing system is non-operational in a powered off state of the data processing system;

in response to identifying the occurrence:
      issuing, by a management controller of the data processing system that is separate from the components of the data processing system, a power flush request to a battery management controller of the data processing system;
      based on the power flush request, flushing, by the battery management controller, the power from at least one power rail that supplies power to the management hardware component, the management controller being a separate data processing system that is physically installed within the data processing system and that operates independently from the data processing system using a second processor that is separate from a first processor of the data processing system, the second processor being capable of issuing commands to the first processor and the other components of the data processing system for the management controller to manage power-related and non-power-related operations of the data processing system; and
      after the duration of time after the power is flushed from the at least one power rail, refreshing, by the battery management controller, power to the at least one power rail.

14. The non-transitory machine-readable medium of claim 13, wherein identifying the occurrence of the event comprises:

during a startup of the data processing system:
      obtaining first user input indicating a power reset of the data processing system is to be performed, the power reset being accomplished by depowering all power rails of the data processing system;
      based on the first user input, providing, to a user and via a graphical user interface, a request to confirm the request for the power reset;
      obtaining, via the graphical user interface, second user input confirming the request for the power reset; and
      treating the second user input as an indication of the occurrence of the event.

15. The non-transitory machine-readable medium of claim 13, wherein identifying the occurrence of the event comprises:

identifying, by the management controller, a second duration of time from a start of a startup procedure of the data processing system while the startup procedure has not completed; and
   treating an occurrence of the second duration of time as an indication of the occurrence of the event.

16. The non-transitory machine-readable medium of claim 13, wherein the at least one power rail comprises a first power rail that supplies the power to processing hardware components of the data processing system, a second power rail that supplies the power to the management controller, and a third power rail that supplies the power to at least the management hardware component.

17. A data processing system, comprising:

at least one processor; and
   a memory that is coupled to the processor and stores instructions, which when executed by the processor, cause the data processing system to perform operations for managing power in the data processing system, the operations comprising:
      identifying an occurrence of an event impacting a management hardware component of the data processing system, the event being likely to cause undesired operation of the management hardware component until the power is withdrawn from the management hardware component for a duration of time, the management hardware component being powered by a primary battery of the data processing system, and the management hardware component being a component of the data processing system that remains powered by the primary battery even when all other components of the data processing system are depowered when the data processing system is non-operational in a powered off state of the data processing system;
      in response to identifying the occurrence:
         issuing, by a management controller of the data processing system that is separate from the components of the data processing system, a power flush request to a battery management controller of the data processing system, the management controller being a separate data processing system that is physically installed within the data processing system and that operates independently from the data processing system using a second processor that is separate from a first processor of the data processing system, the second processor being capable of issuing commands to the first processor and the other components of the data processing system for the management controller to manage power-related and non-power-related operations of the data processing system;
         based on the power flush request, flushing, by the battery management controller, the power from at least one power rail that supplies power to the management hardware component; and
         after the duration of time after the power is flushed from the at least one power rail, refreshing, by the battery management controller, power to the at least one power rail.

18. The data processing system of claim 17, wherein identifying the occurrence of the event comprises:

during a startup of the data processing system:
      obtaining first user input indicating a power reset of the data processing system is to be performed, the power reset being accomplished by depowering all power rails of the data processing system;

based on the first user input, providing, to a user and via a graphical user interface, a request to confirm the request for the power reset;

obtaining, via the graphical user interface, second user input confirming the request for the power reset; and treating the second user input as an indication of the occurrence of the event.

19. The data processing system of claim 17, wherein identifying the occurrence of the event comprises:

identifying, by the management controller, a second duration of time from a start of a startup procedure of the data processing system while the startup procedure has not completed; and treating an occurrence of the second duration of time as an indication of the occurrence of the event.

20. The data processing system of claim 7, wherein the at least one power rail comprises a first power rail that supplies the power to processing hardware components of the data processing system, a second power rail that supplies the power to the management controller, and a third power rail that supplies the power to at least the management hardware component.

* * * * *